US010814178B1

(12) United States Patent
Crahan et al.

(10) Patent No.: US 10,814,178 B1
(45) Date of Patent: *Oct. 27, 2020

(54) GOLF BALL HAVING INDENTATIONS IN A LATTICE STRUCTURE

(71) Applicant: Callaway Golf Company, Carlsbad, CA (US)

(72) Inventors: Grady C. Crahan, Oceanside, CA (US); Timothy B. Davis, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,038

(22) Filed: Jul. 26, 2019

Related U.S. Application Data

(60) Provisional application No. 62/713,395, filed on Aug. 1, 2018, provisional application No. 62/713,309, filed on Aug. 1, 2018.

(51) Int. Cl.
| | | |
|---|---|---|
| *A63B 37/00* | (2006.01) | |
| *A63B 37/12* | (2006.01) | |
| *B29L 31/54* | (2006.01) | |
| *B29C 67/24* | (2006.01) | |
| *B29K 105/00* | (2006.01) | |
| *B29K 75/00* | (2006.01) | |

(52) U.S. Cl.
CPC ...... *A63B 37/0009* (2013.01); *A63B 37/0015* (2013.01); *A63B 37/0019* (2013.01); *A63B 37/0033* (2013.01); *A63B 37/0053* (2013.01); *A63B 37/0075* (2013.01); *A63B 37/0074* (2013.01); *A63B 37/0076* (2013.01); *B29C 67/246* (2013.01); *B29K 2075/00* (2013.01); *B29K 2105/0002* (2013.01); *B29L 2031/546* (2013.01)

(58) Field of Classification Search
CPC ................. A63B 37/0009; A63B 37/0004
USPC ......................... 473/365, 378, 383
See application file for complete search history.

(56) References Cited

U.S. PATENT DOCUMENTS

| | | | | |
|---|---|---|---|---|
| 5,467,994 A * | 11/1995 | Moriyama | ......... | A63B 37/0003 473/354 |
| 5,720,676 A * | 2/1998 | Shimosaka | ........ | A63B 37/0004 264/328.1 |
| 2005/0037871 A1 * | 2/2005 | Nardacci | ............ | A63B 37/0004 473/378 |
| 2005/0227787 A1 * | 10/2005 | Ogg | .................... | A63B 37/0003 473/378 |
| 2005/0227790 A1 * | 10/2005 | Simonds | ............ | A63B 37/0004 473/378 |

* cited by examiner

*Primary Examiner* — John E Simms, Jr.
(74) *Attorney, Agent, or Firm* — Michael A. Catania; Sonia Lari; Rebecca Hanovice

(57) ABSTRACT

A golf ball (20) approaching zero land area is disclosed herein with a plurality of indentations positioned on the lattices of a plurality of multi-faceted polygons. The golf ball (20) has an innersphere with a plurality of lattice members (40). Each of the plurality of lattice members (40) has an apex and the golf ball (20) of the present invention conforms with the 1.68 inches requirement for USGA-approved golf balls.

13 Claims, 13 Drawing Sheets

GOLF BALL HAVING INDENTATIONS IN A LATTICE STRUCTURE

CROSS REFERENCE TO RELATED APPLICATION

The Present Application claims priority to U.S. Provisional Patent Application No. 62/713,395, filed on Aug. 1, 2018, and U.S. Provisional Patent Application No. 62/713,309, filed on Aug. 1, 2018, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to an aerodynamic surface geometry for a golf ball. More specifically, the present invention relates to a golf ball having indentations in a lattice structure.

Description of the Related Art

Golfers realized perhaps as early as the 1800's that golf balls with indented surfaces flew better than those with smooth surfaces. Hand-hammered gutta-percha golf balls could be purchased at least by the 1860's, and golf balls with brambles (bumps rather than dents) were in style from the late 1800's to 1908. In 1908, an Englishman, William Taylor, received a British patent for a golf ball with indentations (dimples) that flew better and more accurately than golf balls with brambles. A.G. Spalding & Brothers purchased the U.S. rights to the patent (embodied possibly in U.S. Pat. No. 1,286,834 issued in 1918) and introduced the GLORY ball featuring the TAYLOR dimples. Until the 1970s, the GLORY ball, and most other golf balls with dimples had 336 dimples of the same size using the same pattern, the ATTI pattern. The ATTI pattern was an octahedron pattern, split into eight concentric straight line rows, which was named after the main producer of molds for golf balls.

The only innovation related to the surface of a golf ball during this sixty year period came from Albert Penfold who invented a mesh-pattern golf ball. This pattern was invented in 1912 and was accepted until the 1930's. A combination of a mesh pattern and dimples is disclosed in Young, U.S. Pat. No. 2,002,726, for a Golf Ball, which issued in 1935.

The traditional golf ball, as readily accepted by the consuming public, is spherical with a plurality of dimples, with each dimple having a circular cross-section. Many golf balls have been disclosed that break with this tradition, however, for the most part these non-traditional golf balls have been commercially unsuccessful.

Most of these non-traditional golf balls still attempt to adhere to the Rules Of Golf as set forth by the United States Golf Association ("USGA") and The Royal and Ancient Golf Club of Saint Andrews ("R&A"). As set forth in Appendix III of the Rules of Golf, the weight of the ball shall not be greater than 1.620 ounces avoirdupois (45.93 gm), the diameter of the ball shall be not less than 1.680 inches (42.67 mm) which is satisfied if, under its own weight, a ball falls through a 1.680 inches diameter ring gauge in fewer than 25 out of 100 randomly selected positions, the test being carried out at a temperature of 23±1° C., and the ball must not be designed, manufactured or intentionally modified to have properties which differ from those of a spherically symmetrical ball.

One example is Shimosaka et al., U.S. Pat. No. 5,916,044, for a Golf Ball that discloses the use of protrusions to meet the 1.68 inch (42.67 mm) diameter limitation of the USGA and R&A. The Shimosaka patent discloses a golf ball with a plurality of dimples on the surface and a few rows of protrusions that have a height of 0.001 to 1.0 mm from the surface. Thus, the diameter of the land area is less than 42.67 mm.

Another example of a non-traditional golf ball is Puckett et al., U.S. Pat. No. 4,836,552 for a Short Distance Golf Ball, which discloses a golf ball having brambles instead of dimples in order to reduce the flight distance to half of that of a traditional golf ball in order to play on short distance courses.

Another example of a non-traditional golf ball is Pocklington, U.S. Pat. No. 5,536,013 for a Golf Ball, which discloses a golf ball having raised portions within each dimple, and also discloses dimples of varying geometric shapes, such as squares, diamonds and pentagons. The raised portions in each of the dimples of Pocklington assist in controlling the overall volume of the dimples.

Another example is Kobayashi, U.S. Pat. No. 4,787,638 for a Golf Ball, which discloses a golf ball having dimples with indentations within each of the dimples. The indentations in the dimples of Kobayashi are to reduce the air pressure drag at low speeds in order to increase the distance.

Yet another example is Treadwell, U.S. Pat. No. 4,266,773 for a Golf Ball, which discloses a golf ball having rough bands and smooth bands on its surface in order to trip the boundary layer of air flow during flight of the golf ball.

Aoyama, U.S. Pat. No. 4,830,378, for a Golf Ball With Uniform Land Configuration, discloses a golf ball with dimples that have triangular shapes. The total land area of Aoyama is no greater than 20% of the surface of the golf ball, and the objective of the patent is to optimize the uniform land configuration and not the dimples.

Another variation in the shape of the dimples is set forth in Steifel, U.S. Pat. No. 5,890,975 for a Golf Ball And Method Of Forming Dimples Thereon. Some of the dimples of Steifel are elongated to have an elliptical cross-section instead of a circular cross-section. The elongated dimples make it possible to increase the surface coverage area. A design patent to Steifel, U.S. Pat. No. 406,623, has all elongated dimples.

A variation on this theme is set forth in Moriyama et al., U.S. Pat. No. 5,722,903, for a Golf Ball, which discloses a golf ball with traditional dimples and oval-shaped dimples.

A further example of a non-traditional golf ball is set forth in Shaw et al., U.S. Pat. No. 4,722,529, for Golf Balls, which discloses a golf ball with dimples and 30 bald patches in the shape of a dumbbell for improvements in aerodynamics.

Another example of a non-traditional golf ball is Cadorniga, U.S. Pat. No. 5,470,076, for a Golf Ball, which discloses each of a plurality of dimples having an additional recess. It is believed that the major and minor recess dimples of Cadorniga create a smaller wake of air during flight of a golf ball.

Oka et al., U.S. Pat. No. 5,143,377, for a Golf Ball, discloses circular and non-circular dimples. The non-circular dimples are square, regular octagonal and regular hexagonal. The non-circular dimples amount to at least forty percent of the 332 dimples on the golf ball. These non-circular dimples of Oka have a double slope that sweeps air away from the periphery in order to make the air turbulent.

Machin, U.S. Pat. No. 5,377,989, for Golf Balls With Isodiametrical Dimples, discloses a golf ball having dimples with an odd number of curved sides and arcuate apices to reduce the drag on the golf ball during flight.

Lavallee et al., U.S. Pat. No. 5,356,150, discloses a golf ball having overlapping elongated dimples to obtain maximum dimple coverage on the surface of the golf ball.

Oka et al., U.S. Pat. No. 5,338,039, discloses a golf ball having at least forty percent of its dimples with a polygonal shape. The shapes of the Oka golf ball are pentagonal, hexagonal and octagonal.

Ogg, U.S. Pat. No. 6,290,615 for a Golf Ball Having A Tubular Lattice Pattern discloses a golf ball with a non-dimple aerodynamic pattern.

The flow-field near the surface of a golf ball has small and large coherent structures that make-up the boundary layer. The dimples and/or hexagonal geometries are successful at producing the larger structures needed to produce turbulent flow on a golf ball but not the small coherent structures.

Looking at the transition process (FIG. 13), it begins with a breakdown of the laminar flow to Tollmien-Schlichting waves that produce streamwise vorticity seen as lambda waves. This region further breaks down into turbulent spots and ultimately fully turbulent flow. The present invention looks to bypass the early process of Tollmien-Schlichting waves and streamwise vorticity and initiate the Turbulent spots. This will speed up the energy cascade that ultimately leads to a turbulent boundary layer so that there is less drag induced on the golf ball from the unsteadiness in this process.

Dimples on a golf ball are used to help a laminar boundary layer transition to a turbulent boundary layer at lower Reynolds numbers (i.e. lowering the Critical Reynolds number). This accepted method for transitioning a boundary layer has been used for years across many companies. Currently no one has made a ball that looks to use small scale disturbances on the "land area" of the golf ball to further aid this transition process.

BRIEF SUMMARY OF THE INVENTION

The present invention improves aerodynamic symmetry and distance on the USGA test by adding smaller indentations on the surface, to produce the smaller coherent structures needed in the boundary layer.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 9:
FIG. 9 is an illustration a golf ball having hemispherical indentations at intersections of a lattice structure.
Figure 10:
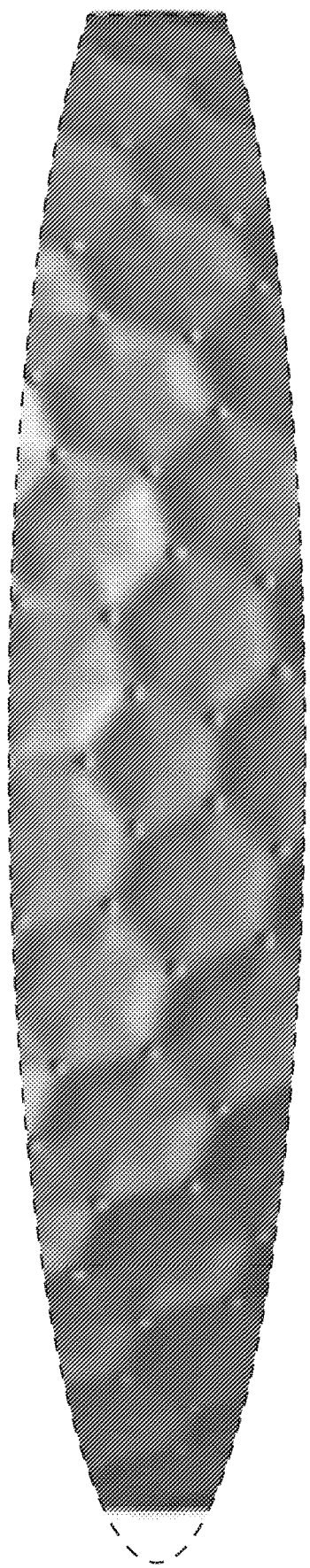
FIG. 10 is an enlarged view of circle 10 of FIG. 9.
Figure 11:
FIG. 11 is an illustration of prior art golf balls.
Figure 12:
FIG. 12 is an illustration of a golf ball having hemispherical indentations in a lattice structure.
Figure 13:
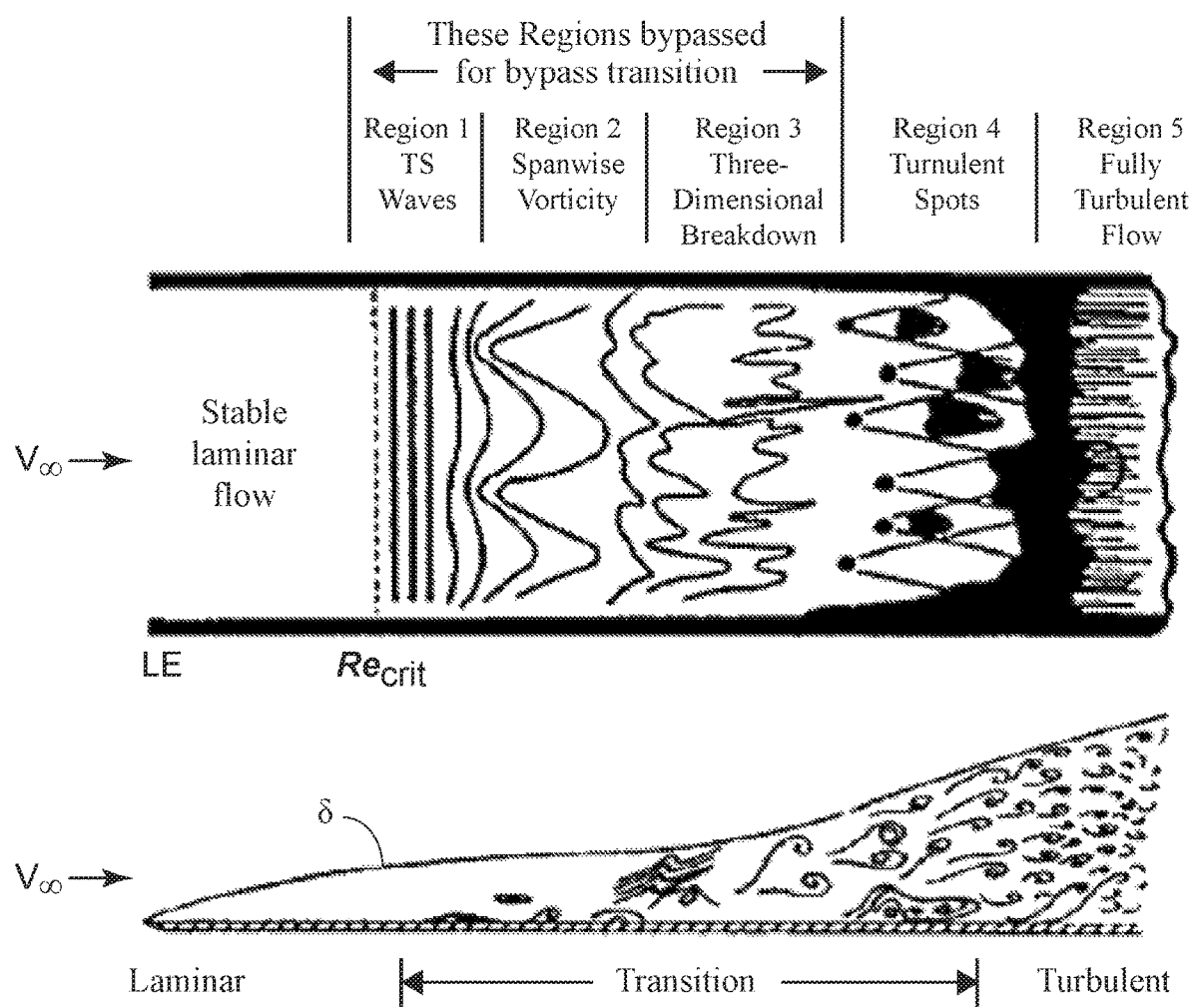
FIG. 13 is an illustration of laminar flow about a surface of a golf ball.
Figure 14:
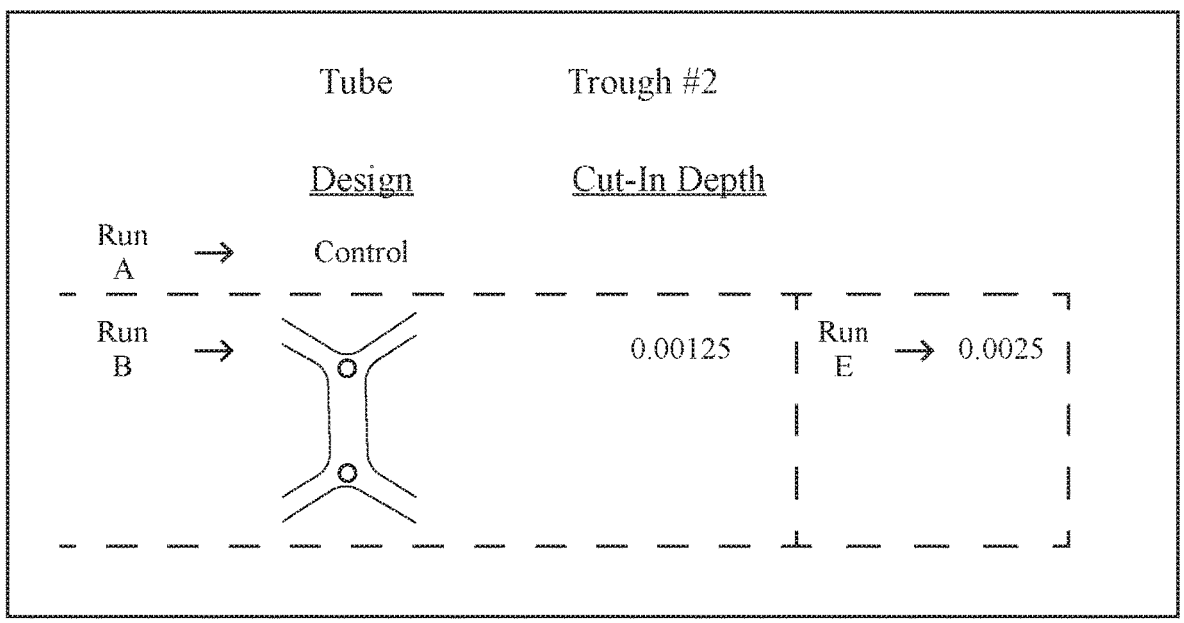
FIG. 14 is an isolated illustration of a lattice structure with indentations.

The location on a hexagonal lattice where three geometries meet, there is a hemispherical indentation (As shown in FIGS. 9-10). The depth of the indentation is preferably 0.00375 inch for the data presented, and preferably ranges from 0.001 inch to 0.010 inch. The ball with these dots showed an increase in apex height relative to a control golf ball for driver launch conditions at different ball speeds.

Hemispherical indentations are positioned at the locations shown in FIGS. 9-10, and each of the hemispherical indentations preferably has a depth of 0.0037 inch.

TABLE ONE

| Ball | Ball Speed (MPH) | Ball Spin (RPM) | Launch Angle (Degrees) | Carry Yards | Total Yards | Apex (Feet) |
| --- | --- | --- | --- | --- | --- | --- |
| Hemispherical Dots | 170 | 2500 | 10.5 | 280.1 | 302.4 | 98.0 |
| Control | 170 | 2500 | 10.5 | 280.3 | 303.0 | 97.2 |
| Hemispherical Dots | 150 | 2500 | 12 | 243.9 | 267.9 | 82.8 |
| Control | 150 | 2500 | 12 | 244.0 | 268.5 | 81.8 |
| Hemispherical Dots | 130 | 2500 | 13.5 | 203.7 | 229.3 | 67.0 |
| Control | 130 | 2500 | 13.5 | 203.7 | 230.1 | 65.8 |

Testing was completed on a ball where the depth of the dot is designed to 0.00125" and 0.00375". By adding these small dots to the land area, there was an increase in the CL to CD ratio defined by the coefficient of lift at Re=70k, SP=0.181 and the coefficient of drag at Re=212k and SP=0.075.

TABLE TWO

|  | $C_L$ | $C_D$ | $C_L/C_D$ |
| --- | --- | --- | --- |
| No Dots | 0.20727 | 0.23007 | 0.9009 |
| 0.00125" Deep Dots | 0.21154 | 0.23092 | 0.9161 |
| 0.00375" Deep Dots | 0.21081 | 0.23043 | 0.9149 |

Small indentations in the land area of a golf ball that are much smaller than the larger dimple of the golf ball. These indentations have a depth between 0.00125 inch and 0.00375 inch.

Figure 1:
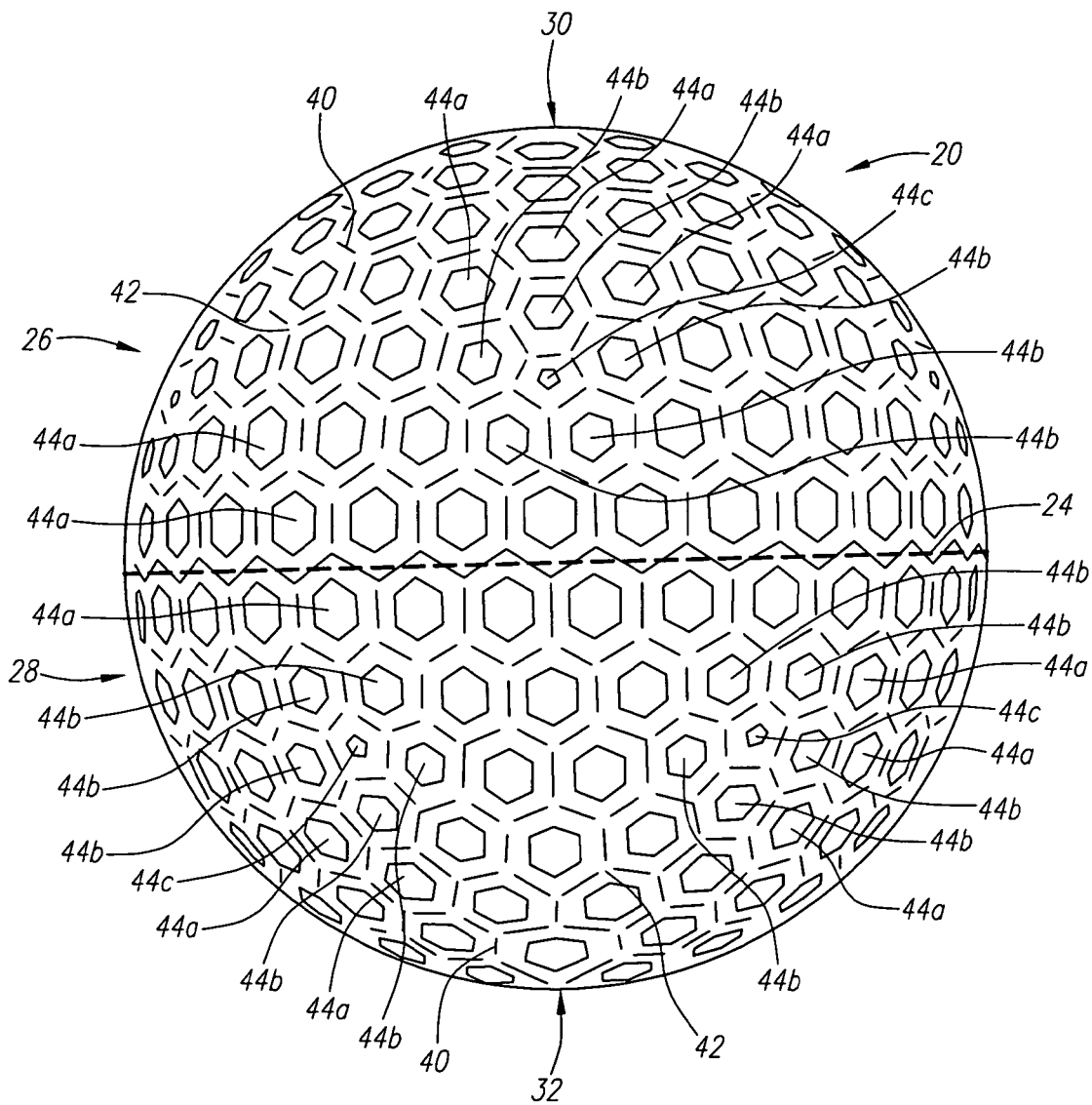
FIG. 1 is an equatorial view of a golf ball with multi-faceted polygons.

As shown in FIG. 1 and, a golf ball is generally designated 20. The golf ball 20 may be a two-piece golf ball, a three-piece golf ball, or a greater multi-layer golf ball. The golf ball 20 may be wound or solid. Additionally, the core of the golf ball 20 may be solid, hollow, or filled with a fluid, such as a gas or liquid, or have a metal mantle. The cover of the golf ball 20 may be any suitable material. A preferred cover for a three-piece golf ball is composed of a thermoset polyurethane material. Alternatively, the cover may be composed of a thermoplastic polyurethane, ionomer blend, ionomer rubber blend, ionomer and thermoplastic polyurethane blend, or like materials. A preferred cover material for a two-piece golf ball is a blend of ionomers. Those skilled in the pertinent art will recognize that other cover materials may be utilized without departing from the scope and spirit of the present invention. The golf ball 20 may have a finish of one or two basecoats and/or one or two top coats.

The golf ball 20 preferably has an innersphere 21 (FIG. 6) with an innersphere surface 22. The golf ball 20 also has an equator 24 (shown by dashed line) generally dividing the golf ball 20 into a first hemisphere 26 and a second hemisphere 28. A first pole 30 is generally located ninety degrees along a longitudinal arc from the equator 24 in the first hemisphere 26. A second pole 32 is generally located ninety degrees along a longitudinal arc from the equator 24 in the second hemisphere 28.

Figure 2:
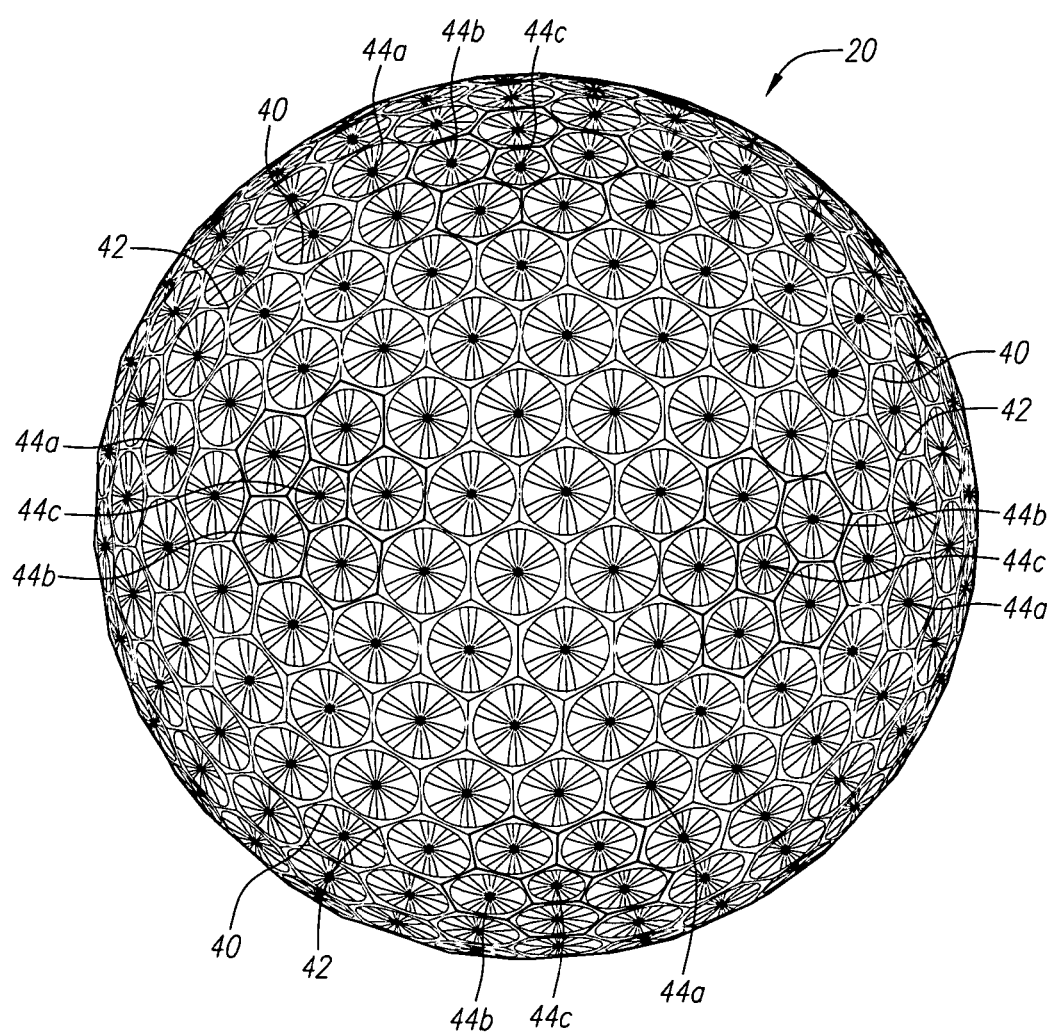
FIG. 2 is a CAD drawing of the equatorial view of the golf ball in FIG. 1 illustrating the multi-faceted aerodynamic pattern.

Descending toward the surface 22 of the innersphere 21 are a plurality of lattice members 40. In a preferred embodiment, the lattice members 40 are constructed from quintic Bezier curves. However, those skilled in the pertinent art will recognize that the lattice members 40 may have other similar shapes. The lattice members 40 are connected together to form a lattice structure 42 on the golf ball 20. The interconnected lattice members 40 form a plurality of polygons encompassing discrete areas of the surface 22 of the innersphere 21. Most of these discrete bounded areas 44 are preferably hexagonal-shaped bounded areas 44a and 44b, with a few pentagonal-shaped bounded areas 44c. In the embodiment of FIGS. 1 and 2, there are 332 polygons. In the preferred embodiment, each lattice member 40 is preferably connected to at least one other lattice member 40. Each lattice member 40 preferably connects to at least two other lattice members 40 at a vertex. Most of the vertices are the congruence of three lattice members 40, however, some vertices are the congruence of four lattice members 40. The length of each lattice member 40 preferably ranges from 0.150 inch to 0.160 inch.

The preferred embodiment of the present invention has reduced the land area of the surface of the golf ball 20 to almost zero, since preferably only a line of each of the plurality of lattice members 40 lies on a phantom outersphere 23 (FIG. 6) of the golf ball 20, which preferably has a diameter of at least 1.68 inches. More specifically, the land area of a traditional golf ball is the area forming a sphere of at least 1.68 inches for USGA and R&A conforming golf balls. This land area is traditionally minimized with dimples that are concave with respect to the spherical surface of the traditional golf ball, resulting in land area on the non-dimpled surface of the golf ball. The golf ball 20 of the present invention, however, has only a line extending along an apex 50 of each of the lattice members 40 that lies on and defines the outersphere 23 of the golf ball 20.

Traditional golf balls were designed to have the dimples "trip" the boundary layer on the surface of a golf ball in flight to create a turbulent flow for greater lift and reduced drag. The golf ball 20 of the present invention has the lattice structure 42 to trip the boundary layer of air about the surface of the golf ball 20 in flight.

Figure 6:
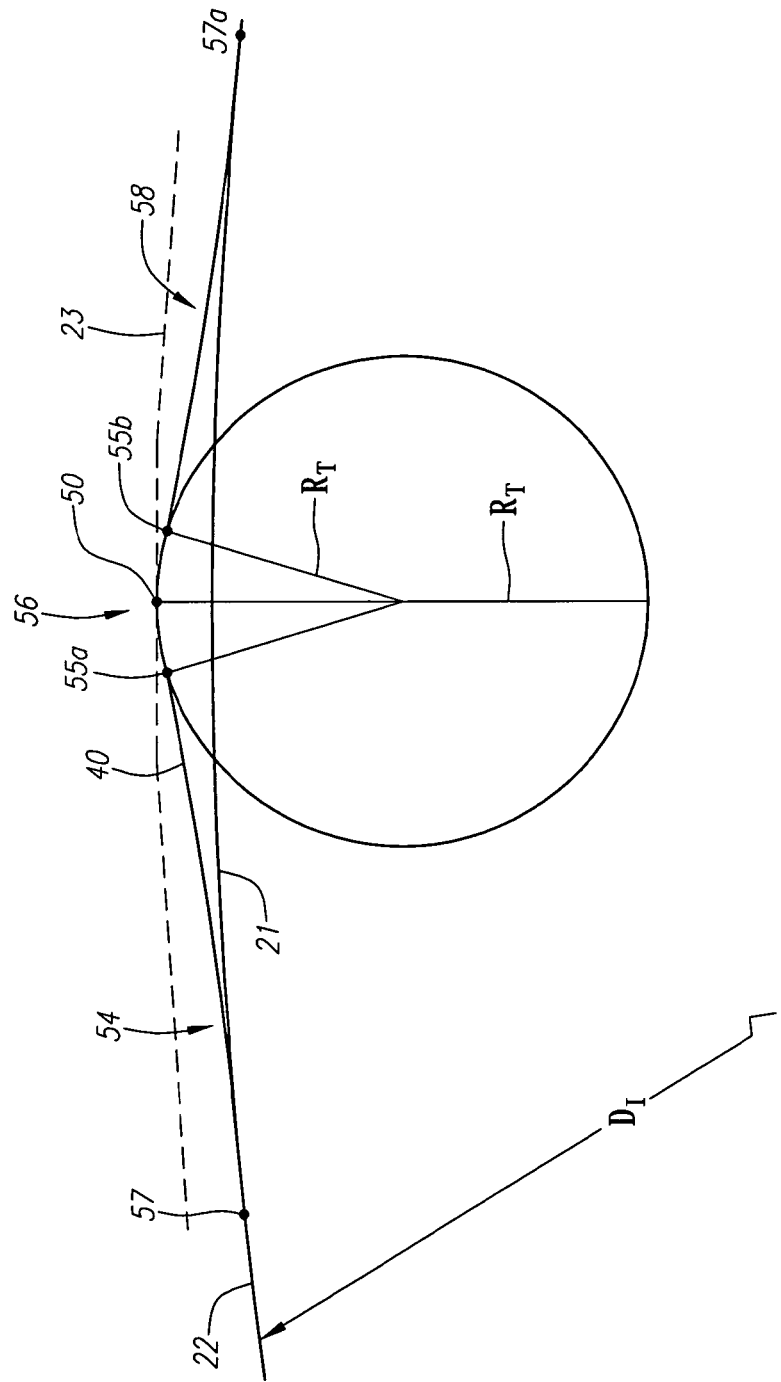
FIG. 6 is an enlarged, isolated, cross-sectional view of a projection extending from an innersphere surface of a golf ball of the present invention.

As shown in FIG. 6, the outersphere 23 is shown by a dashed line. In the preferred embodiment, the apex 50 of each primary lattice member 40 lies on the outersphere 23, and the outersphere represents a diameter of the golf ball of 1.68 inches. One difference between the golf ball 20 of the present invention and traditional, dimpled golf balls is that for the golf ball 20 of the present invention, a smaller portion of the golf ball is located at or near the outersphere 23 compared to a traditional golf ball. Thus, for the golf ball 20 of the present invention, a sphere having a diameter slightly less than that of the outersphere 23 would contain a greater percent of the volume of the golf ball 20 compared to the same sphere for a traditional dimpled golf ball.

Figure 7:
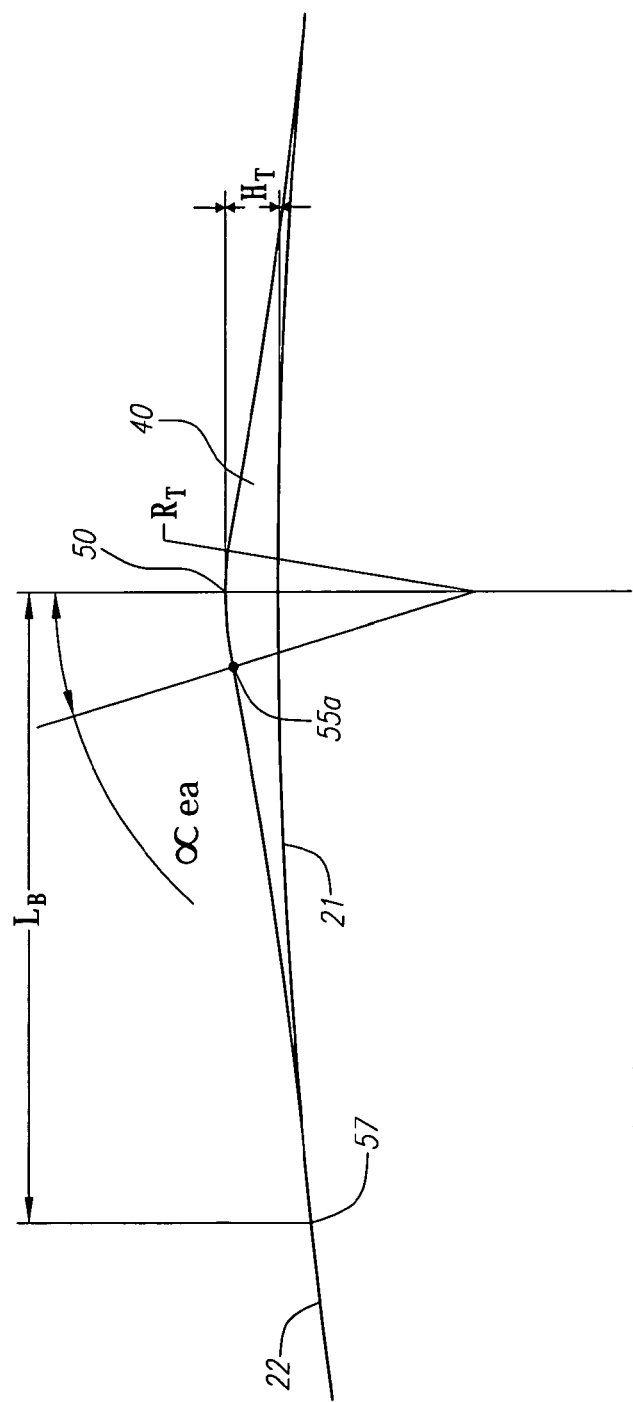
FIG. 7 is an enlarged, isolated, cross-sectional view of a projection extending from an innersphere surface of a golf ball of the present invention.

As shown in FIG. 7, the height $H_T$, of each of the plurality of lattice members 40 from the innersphere 21 to an apex 50 of the lattice member 40 will vary in order to have the golf ball 20 meet or exceed the 1.68 inches requirement. For example, if the diameter, $D_I$ (as shown in FIG. 15) of the innersphere 21 is 1.666 inches, then the distance $H_T$ in FIG. 16 is preferably 0.007 inch, since the lattice member 40 on one side of the golf ball 20 is combined with a corresponding lattice member 40 on the opposing side of the golf ball 20 to reach the USGA requirement of 1.68 inches for the diameter of a golf ball. In an alternative embodiment, the innersphere 21 has a diameter, $D_I$, that is less than 1.666 inches and each of the plurality of lattice members 40 has a height, $H_T$, that is greater than 0.007 inch. For example, in one alternative embodiment, the diameter $D_I$, of the innersphere 21 is 1.662 while the height, $H_T$, of each of the primary lattice members 40 is 0.009 inch, thereby resulting in an outersphere 23 with a diameter of 1.68 inches. In a preferred embodiment of the invention, the distance $H_T$ ranges from 0.005 inch to 0.015 inch. The width of each of the apices 50 is minimal, since each apex lies along an arc of a lattice member 40. In theory, the width of each apex 50 should approach the width of a line. In practice, the width of each apex 50 of each lattice member 40 is determined by the precision of the mold utilized to produce the golf ball 20.

As shown in FIGS. 6-7, each lattice member 40 is preferably constructed using a radius $R_T$, of an imaginary tube set within the innersphere 21 of the golf ball 20. The very top portion of the imaginary tube extends beyond the surface 22 of the innersphere 21. In a preferred embodiment the radius $R_T$ is approximately 0.05 inch. The apex 50 of the lattice member 40 preferably lies on the radius $R_T$, of the imaginary tube. Points 55a and 55b represent the inflection points of the lattice member 40, and inflection points 55a and 55b both preferably lie on the radius $R_T$, of the imaginary tube. At inflection points 55a and 55b, the surface contour of the lattice member preferably changes from concave to convex. Points 57 and 57a represent the beginning of the lattice member 40, extending beyond the surface 22 of the innersphere 21. The surface contour of the lattice member 40 is preferably concave between point 57 and inflection point 55a, convex between inflection point 55a and inflection point 55b, and concave between inflection point 55b and point 57a.

As shown in FIG. 7, a blend length LB is the distance from point 57 to apex 50. Table Three provides preferred blend lengths for the primary lattice members 40 of a preferred embodiment. An entry angle $\alpha_{EA}$ is the angle relative the perpendicular line at the inflection point 55a and a perpendicular line through the apex 50. In a preferred embodiment, the entry angle $\alpha_{EA}$ is 14.65 degrees.

TABLE THREE

| Bounded area | Number | Blend Radius, $R_B$ | Sub-Lattice Distance, $L_D$ | Blend length, $L_B$ | Tube Height, $H_T$ |
|---|---|---|---|---|---|
| Pentagon, 44c | 12 | 0.15 inch | 0.045 inch | 0.075 inch | 0.0103 inch |
| Hexagon, 44b | 60 | 0.23 inch | 0.062 inch | 0.090 inch | 0.0103 inch |
| Hexagon, 44a | 260 | 0.23 inch | 0.062 inch | 0.100 inch | 0.0103 inch |

Each lattice member 40 preferably has a contour that has a first concave section 54 (between point 57 and inflection point 55a), a convex section 56 (between inflection point 55a and inflection point 55b), and a second concave section 58 (between inflection point 55b and point 57a). In a preferred embodiment, each of the primary lattice members 40 has a continuous contour with a changing radius along the entire surface contour. The radius $R_T$ of each of the primary lattice members 40 is preferably in the range of 0.020 inch to 0.070 inch, more preferably 0.040 inch to 0.050 inch, and most preferably 0.048 inch. The inflection points 55a and 55b, which define the start and end of the convex section 56, are defined by the radius $R_T$. The curvature of the convex section 56, however, is not necessarily determined by the radius $R_T$. Instead, one of ordinary skill in the art will appreciate that the convex section 56 may have any suitable curvature.

As discussed above, the lattice members 40 are interconnected to form a plurality of polygons. The intersection of two lattice members 40 forms a crease, whose surface is then smoothed, or blended, using a blend radius RB. Table Three provides preferred blend radii for the lattice members 40 of the preferred embodiment. The blend radius RB is preferably in the range of 0.100 inch to 0.300 inch, more preferably 0.15 inch to 0.25 inch, and most preferably 0.23 inch for the majority of lattice members 40. By way of example, in the hexagon-bounded area illustrated in FIGS. 3 and 4, facets 70 and 80 are crease regions that have been blended using a blend radius RB.

The continuous surface contour of the golf ball 20 allows for a smooth transition of air during the flight of the golf ball 20. The air pressure acting on the golf ball 20 during its flight is driven by the contour of each lattice member 40. Some traditional dimples have a curvature discontinuity at their transition points. Reducing the discontinuity of the contour reduces the discontinuity in the air pressure distribution during the flight of the golf ball 20, which reduces the separation of the turbulent boundary layer that is created during the flight of the golf ball 20.

For the lattice members 40, the equations defining the cross-sectional shape require the location of the points 57 and 57a, the inflection points 55a and 55b, the apex 50, the entry angle $\alpha_{EA}$, the radius of the golf ball $R_{ball}$, the radius of the imaginary tube $R_T$, the curvature at the apex 50, and the tube height, $H_T$.

Figure 8:
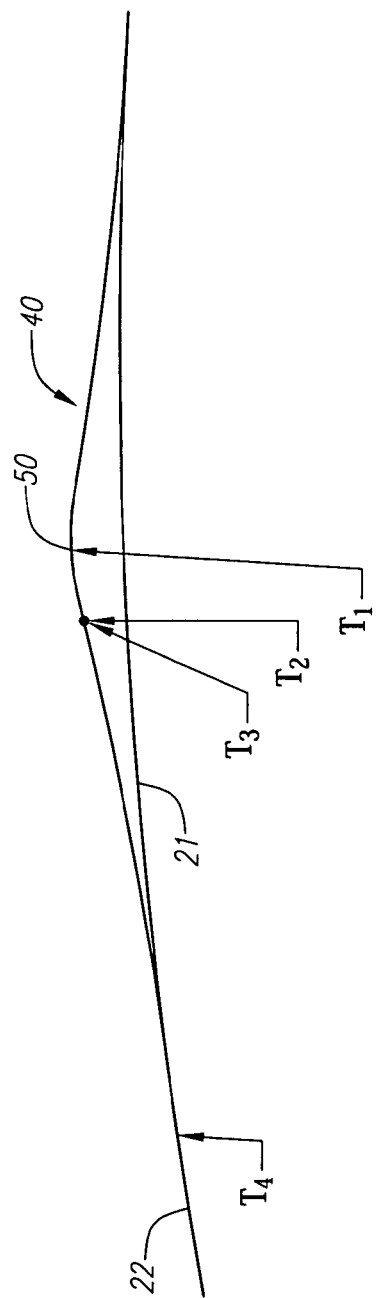
FIG. 8 is an enlarged, isolated, cross-sectional view of a projection extending from an innersphere surface of a golf ball of the present invention.

Additionally, as shown in FIG. 8, tangent magnitude points also define the bridge curves. Tangent magnitude point $T_1$ corresponds to the apex 50 (convex curve), and a preferred tangent magnitude value is 0.5. Tangent magnitude point $T_2$ corresponds to the inflection point 55a (convex curve), and a preferred tangent magnitude value is 0.5. Tangent magnitude point $T_3$ corresponds to the inflection point 55a (concave curve), and a preferred tangent magnitude value is 1. Tangent magnitude point $T_4$ corresponds to the point 57 (concave curve), and a preferred tangent magnitude value is 1.

This information allows for the surface contour of the lattice member 40 to be designed to be continuous throughout the lattice member 40. In constructing the contour, two associative bridge curves are prepared as the basis of the contour. A first bridge curve is overlaid from the point 57 to the inflection point 55a, which eliminates the step discontinuity in the curvature that results from having true arcs point continuous and tangent. The second bridge curve is overlaid from the inflection point 55a to the apex 50. The attachment of the bridge curves at the inflection point 55a allows for equivalence of the curvature and controls the surface contour of the lattice member 40. The dimensions of the curvature at the apex 50 also controls the surface contour of the lattice member. The shape of the contour may be refined using the parametric stiffness controls available at each of the bridge curves. The controls allow for the fine tuning of the shape of each of the lattice members by scaling tangent and curvature poles on each end of the bridge curves.

Figure 3:
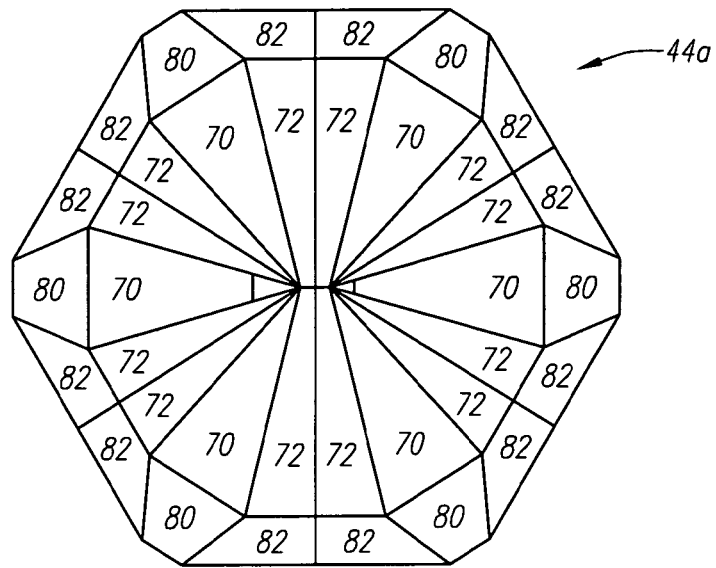
FIG. 3 is an isolated top plan view of a multi-faceted hexagon of the golf ball of FIG. 1.
Figure 4:
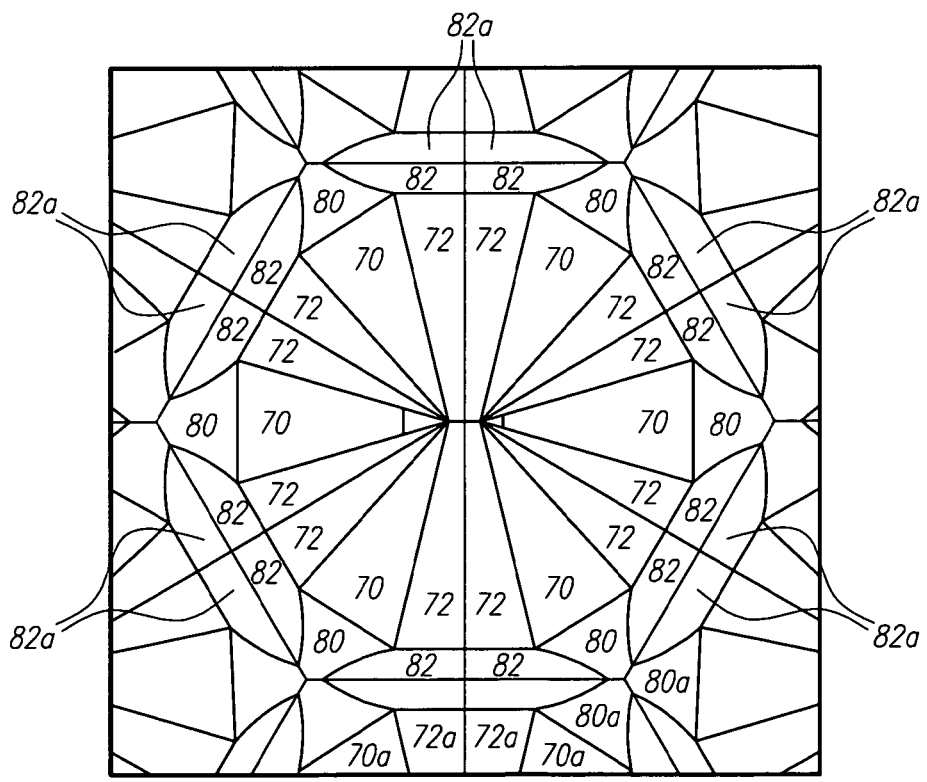
FIG. 4 is a CAD drawing of the multi-faceted hexagon of FIG. 3.
Figure 5:
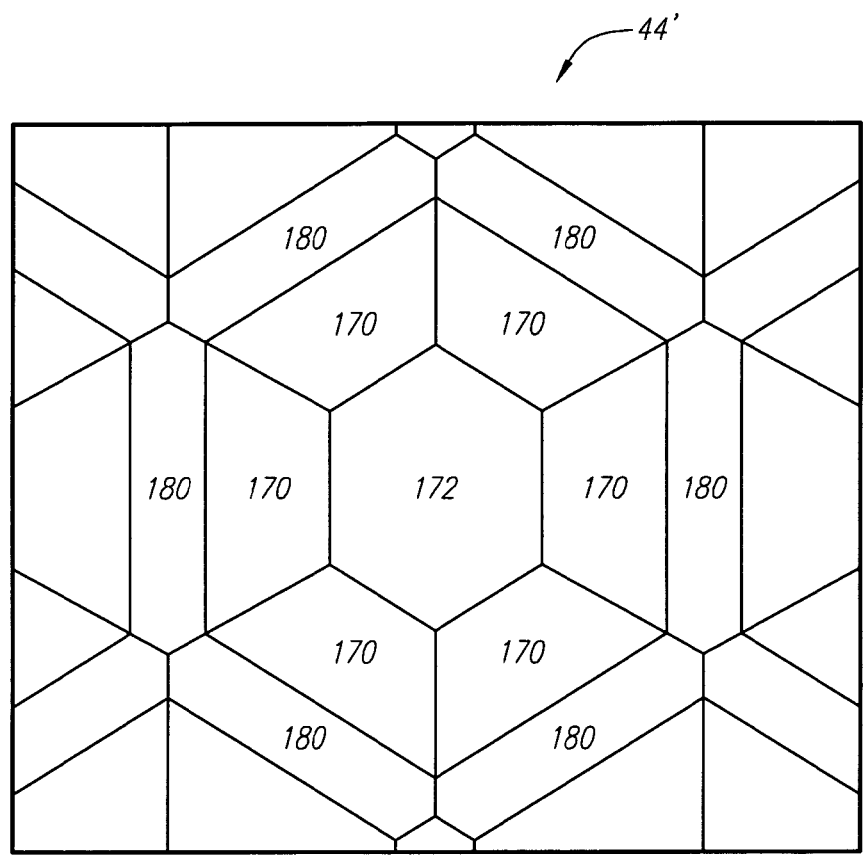
FIG. 5 is a CAD drawing of a multi-faceted hexagon of a prior art golf ball.

An additional feature of the present invention is the multi-faceted primary hexagon-bounded area, as shown in FIGS. 3 and 4. The hexagon-bounded area 44a of the present invention has a greater number of facets than the hexagon-bounded area 44' of the prior art (FIG. 5), which is the HX® RED golf ball and HX® BLUE golf ball from Callaway Golf Company of Carlsbad, Calif. The increase in facets is due to the blended regions at the intersection of lattice members. The hexagon-bounded area 44a has inner facets 70, 70a and 72, and outer facets 80 and 82. In a preferred embodiment, hexagon-bounded area 44a has twenty inner facets 70, 70a and 72, and eighteen outer facets 80 and 82. The hexagon-bounded area 44' of the prior art had seven inner facets 170 and 172 (innersphere surface) and six outer facets. The greater number of facets in the hexagon bounded area 44a of the present invention allows for better control of the surface contour, thereby resulting in better lift and drag properties, which results in greater distance.

In one embodiment, the golf ball 20 is constructed as set forth in U.S. Pat. No. 6,117,024, for a Golf Ball With A Polyurethane Cover, which pertinent parts are hereby incorporated by reference. The golf ball 20 has a coefficient of restitution at 143 feet per second greater than 0.7964, and an USGA initial velocity less than 255.0 feet per second. The preferred golf ball 20 has a COR of approximately 0.8152 at 143 feet per second, and an initial velocity between 250 feet per second to 255 feet per second under USGA initial velocity conditions. A more thorough description of a high COR golf ball is disclosed in U.S. Pat. No. 6,443,858, which pertinent parts are hereby incorporated by reference.

Additionally, the core of the golf ball 20 may be solid, hollow, or filled with a fluid, such as a gas or liquid, or have a metal mantle. The cover of the golf ball 20 may be any suitable material. A preferred cover for a three-piece golf ball is composed of a thermoset polyurethane material. Alternatively, the cover may be composed of a thermoplastic polyurethane, ionomer blend, ionomer rubber blend, ionomer and thermoplastic polyurethane blend, or like materials. A preferred cover material for a two-piece golf ball is a blend of ionomers. Alternatively, the golf ball 20 may have a thread layer. Those skilled in the pertinent art will recognize that other cover materials may be utilized without departing from the scope and spirit of the present invention. The golf ball 20 may have a finish of one or two basecoats and/or one or two top coats.

In an alternative embodiment of a golf ball 20, with the construction as shown in FIG. 8, the boundary layer 16 or cover layer 14 is comprised of a high acid (i.e. greater than 16 weight percent acid) ionomer resin or high acid ionomer blend. More preferably, the boundary layer 16 is comprised of a blend of two or more high acid (i.e. greater than 16 weight percent acid) ionomer resins neutralized to various extents by different metal cations.

In an alternative embodiment of a golf ball 20, with the construction as shown in FIG. 8, the boundary layer 16 or cover layer 14 is comprised of a low acid (i.e. 16 weight percent acid or less) ionomer resin or low acid ionomer blend. Preferably, the boundary layer 16 is comprised of a blend of two or more low acid (i.e. 16 weight percent acid or less) ionomer resins neutralized to various extents by different metal cations. The boundary layer 16 compositions of the embodiments described herein may include the high acid ionomers such as those developed by E. I. DuPont de Nemours & Company under the SURLYN brand, and by Exxon Corporation under the ESCOR or IOTEK brands, or blends thereof. Examples of compositions which may be used as the boundary layer 16 herein are set forth in detail in U.S. Pat. No. 5,688,869, which is incorporated herein by reference. Of course, the boundary layer 16 high acid ionomer compositions are not limited in any way to those compositions set forth in said patent. Those compositions are incorporated herein by way of examples only.

The high acid ionomers which may be suitable for use in formulating the boundary layer 16 compositions are ionic copolymers which are the metal (such as sodium, zinc, magnesium, etc.) salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (for example, iso- or n-butylacrylate, etc.) can also be included to produce a softer terpolymer. The carboxylic acid groups of the copolymer are partially neutralized (for example, approximately 10-100%, preferably 30-70%) by the metal ions. Each of the high acid ionomer resins which may be included in the inner layer cover compositions of the invention contains greater than 16% by weight of a carboxylic acid, preferably from about 17% to about 25% by weight of a carboxylic acid, more preferably from about 18.5% to about 21.5% by weight of a carboxylic acid. Examples of the high acid methacrylic acid based ionomers found suitable for use in accordance with this invention include, but are not limited to, SURLYN 8220 and 8240 (both formerly known as forms of SURLYN AD-8422), SURLYN 9220 (zinc cation), SURLYN SEP-503-1 (zinc cation), and SURLYN SEP-503-2 (magnesium cation). According to DuPont, all of these ionomers contain from about 18.5 to about 21.5% by weight methacrylic acid. Examples of the high acid acrylic acid based ionomers suitable for use in the present invention also include, but are not limited to, the high acid ethylene acrylic acid ionomers produced by Exxon such as Ex 1001, 1002, 959, 960, 989, 990, 1003, 1004, 993, and 994. In this regard, ESCOR or IOTEK 959 is a sodium ion neutralized ethylene-acrylic neutralized ethylene-acrylic acid copolymer. According to Exxon, IOTEKS 959 and 960 contain from about 19.0 to about 21.0% by weight acrylic acid with approximately 30 to about 70 percent of the acid groups neutralized with sodium and zinc ions, respectively.

Furthermore, as a result of the previous development by the assignee of this application of a number of high acid ionomers neutralized to various extents by several different types of metal cations, such as by manganese, lithium, potassium, calcium and nickel cations, several high acid ionomers and/or high acid ionomer blends besides sodium, zinc and magnesium high acid ionomers or ionomer blends are also available for golf ball cover production. It has been found that these additional cation neutralized high acid ionomer blends produce boundary layer 16 compositions exhibiting enhanced hardness and resilience due to synergies which occur during processing. Consequently, these metal cation neutralized high acid ionomer resins can be blended to produce substantially higher C.O.R.'s than those produced by the low acid ionomer boundary layer 16 compositions presently commercially available.

More particularly, several metal cation neutralized high acid ionomer resins have been produced by the assignee of this invention by neutralizing, to various extents, high acid copolymers of an alpha-olefin and an alpha, beta-unsaturated carboxylic acid with a wide variety of different metal cation salts. Numerous metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (for example, from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the boundary layer 16 of the golf ball of the invention may be selected from the group consisting of vinyl esters of aliphatic carboxylic acids wherein the acids have 2 to 10 carbon atoms, vinyl ethers wherein the alkyl groups contain 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

The boundary layer 16 compositions may include the low acid ionomers such as those developed and sold by E. I. DuPont de Nemours & Company under the SURLYN and by Exxon Corporation under the brands ESCOR and IOTEK, ionomers made in-situ, or blends thereof.

Another embodiment of the boundary layer 16 comprises a non-ionomeric thermoplastic material or thermoset material. Suitable non-ionomeric materials include, but are not limited to, metallocene catalyzed polyolefins or polyamides, polyamide/ionomer blends, polyphenylene ether/ionomer blends, etc., which preferably have a Shore D hardness of at least 60 (or a Shore C hardness of at least about 90) and a flex modulus of greater than about 30,000 psi, preferably greater than about 50,000 psi, or other hardness and flex modulus values which are comparable to the properties of the ionomers described above. Other suitable materials include but are not limited to, thermoplastic or thermosetting polyurethanes, thermoplastic block polyesters, for example, a polyester elastomer such as that marketed by DuPont under the brand HYTREL, or thermoplastic block polyamides, for example, a polyether amide such as that marketed by Elf Atochem S. A. under the brand PEBEX, a blend of two or more non-ionomeric thermoplastic elastomers, or a blend of one or more ionomers and one or more non-ionomeric thermoplastic elastomers. These materials can be blended with the ionomers described above in order to reduce cost relative to the use of higher quantities of ionomer.

Additional materials suitable for use in the boundary layer 16 or cover layer 14 of the present invention include polyurethanes. These are described in more detail below.

In one embodiment, the cover layer 14 is comprised of a relatively soft, low flex modulus (about 500 psi to about 50,000 psi, preferably about 1,000 psi to about 25,000 psi, and more preferably about 5,000 psi to about 20,000 psi) material or blend of materials. Preferably, the cover layer 14 comprises a polyurethane, a polyurea, a blend of two or more polyurethanes/polyureas, or a blend of one or more ionomers or one or more non-ionomeric thermoplastic materials with a polyurethane/polyurea, preferably a thermoplastic polyurethane or reaction injection molded polyurethane/polyurea (described in more detail below).

The cover layer 14 preferably has a thickness in the range of 0.005 inch to about 0.15 inch, more preferably about 0.010 inch to about 0.050 inch, and most preferably 0.015 inch to 0.025 inch. In one embodiment, the cover layer 14 has a Shore D hardness of 60 or less (or less than 90 Shore C), and more preferably 55 or less (or about 80 Shore C or less). In another preferred embodiment, the cover layer 14 is comparatively harder than the boundary layer 16.

In one preferred embodiment, the cover layer 14 comprises a polyurethane, a polyurea or a blend of polyurethanes/polyureas. Polyurethanes are polymers which are used to form a broad range of products. They are generally formed by mixing two primary ingredients during processing. For the most commonly used polyurethanes, the two primary ingredients are a polyisocyanate (for example, 4,4'-diphenylmethane diisocyanate monomer ("MDI") and toluene diisocyanate ("TDI") and their derivatives) and a polyol (for example, a polyester polyol or a polyether polyol).

A wide range of combinations of polyisocyanates and polyols, as well as other ingredients, are available. Furthermore, the end-use properties of polyurethanes can be controlled by the type of polyurethane utilized, such as whether the material is thermoset (cross linked molecular structure not flowable with heat) or thermoplastic (linear molecular structure flowable with heat).

Cross linking occurs between the isocyanate groups (—NCO) and the polyol's hydroxyl end-groups (—OH). Cross linking will also occur between the $NH_2$ group of the amines and the NCO groups of the isocyanates, forming a polyurea. Additionally, the end-use characteristics of polyurethanes can also be controlled by different types of reactive chemicals and processing parameters. For example, catalysts are utilized to control polymerization rates. Depending upon the processing method, reaction rates can be very quick (as in the case for some reaction injection molding systems ("RIM")) or may be on the order of several hours or longer (as in several coating systems such as a cast system). Consequently, a great variety of polyurethanes are suitable for different end-uses.

Polyurethanes are typically classified as thermosetting or thermoplastic. A polyurethane becomes irreversibly "set" when a polyurethane prepolymer is cross linked with a polyfunctional curing agent, such as a polyamine or a polyol. The prepolymer typically is made from polyether or polyester. A prepolymer is typically an isocyanate terminated polymer that is produced by reacting an isocyanate with a moiety that has active hydrogen groups, such as a polyester and/or polyether polyol. The reactive moiety is a hydroxyl group. Diisocyanate polyethers are preferred because of their water resistance.

The physical properties of thermoset polyurethanes are controlled substantially by the degree of cross linking and by the hard and soft segment content. Tightly cross linked polyurethanes are fairly rigid and strong. A lower amount of cross linking results in materials that are flexible and resilient. Thermoplastic polyurethanes have some cross linking, but primarily by physical means, such as hydrogen bonding. The crosslinking bonds can be reversibly broken by increasing temperature, such as during molding or extrusion. In this regard, thermoplastic polyurethanes can be injection molded, and extruded as sheet and blow film. They can be used up to about 400 degrees Fahrenheit, and are available in a wide range of hardnesses.

Polyurethane materials suitable for the present invention may be formed by the reaction of a polyisocyanate, a polyol, and optionally one or more chain extenders. The polyol component includes any suitable polyether- or polyester polyol. Additionally, in an alternative embodiment, the polyol component is polybutadiene diol. The chain extenders include, but are not limited to, diols, triols and amine extenders. Any suitable polyisocyanate may be used to form a polyurethane according to the present invention. The polyisocyanate is preferably selected from the group of diisocyanates including, but not limited to, 4,4'-diphenylmethane diisocyanate ("MDI"); 2,4-toluene diisocyanate ("TDI"); m-xylylene diisocyanate ("XDI"); methylene bis-(4-cyclohexyl isocyanate) ("HMDI"); hexamethylene diisocyanate ("HDI"); naphthalene-1,5-diisocyanate ("NDI"); 3,3'-dimethyl-4,4'-biphenyl diisocyanate ("TODI"); 1,4-diisocyanate benzene ("PPDI"); phenylene-1,4-diisocyanate; and 2,2,4- or 2,4,4-trimethyl hexamethylene diisocyanate ("TMDI").

Other less preferred diisocyanates include, but are not limited to, isophorone diisocyanate ("IPDI"); 1,4-cyclohexyl diisocyanate ("CHDI"); diphenylether-4,4'-diisocyanate; p,p'-diphenyl diisocyanate; lysine diisocyanate ("LDI"); 1,3-bis (isocyanato methyl) cyclohexane; and polymethylene polyphenyl isocyanate ("PMDI").

One additional polyurethane component which can be used in the present invention incorporates TMXDI ("META") aliphatic isocyanate (Cytec Industries, West Paterson, N.J.). Polyurethanes based on meta-tetramethylxylylene diisocyanate (TMXDI) can provide improved gloss retention UV light stability, thermal stability, and hydrolytic stability. Additionally, TMXDI ("META") aliphatic isocyanate has demonstrated favorable toxicological properties. Furthermore, because it has a low viscosity, it is usable with a wider range of diols (to polyurethane) and diamines (to polyureas). If TMXDI is used, it typically, but not necessarily, is added as a direct replacement for some or all of the other aliphatic isocyanates in accordance with the suggestions of the supplier. Because of slow reactivity of TMXDI, it may be useful or necessary to use catalysts to have practical demolding times. Hardness, tensile strength and elongation can be adjusted by adding further materials in accordance with the supplier's instructions.

The cover layer 14 preferably comprises a polyurethane with a Shore D hardness (plaque) of from about 10 to about 55 (Shore C of about 15 to about 75), more preferably from about 25 to about 55 (Shore C of about 40 to about 75), and most preferably from about 30 to about 55 (Shore C of about 45 to about 75) for a soft cover layer 14 and from about 20 to about 90, preferably about 30 to about 80, and more preferably about 40 to about 70 for a hard cover layer 14.

The polyurethane preferably has a flex modulus from about 1 to about 310 Kpsi, more preferably from about 3 to about 100 Kpsi, and most preferably from about 3 to about 40 Kpsi for a soft cover layer 14 and 40 to 90 Kpsi for a hard cover layer 14.

Non-limiting examples of a polyurethane suitable for use in the cover layer 14 (or boundary layer 16) include a thermoplastic polyester polyurethane such as Bayer Corporation's TEXIN polyester polyurethane (such as TEXIN DP7-1097 and TEXIN 285 grades) and a polyester polyurethane such as B. F. Goodrich Company's ESTANE polyester polyurethane (such as ESTANE X-4517 grade). The thermoplastic polyurethane material may be blended with a soft ionomer or other non-ionomer. For example, polyamides blend well with soft ionomer.

Other soft, relatively low modulus non-ionomeric thermoplastic or thermoset polyurethanes may also be utilized, as long as the non-ionomeric materials produce the playability and durability characteristics desired without adversely affecting the enhanced travel distance characteristic produced by the high acid ionomer resin composition. These include, but are not limited to thermoplastic polyurethanes such as the PELLETHANE thermoplastic polyurethanes from Dow Chemical Co.; and non-ionomeric thermoset polyurethanes including but not limited to those disclosed in U.S. Pat. No. 5,334,673 incorporated herein by reference.

Typically, there are two classes of thermoplastic polyurethane materials: aliphatic polyurethanes and aromatic polyurethanes. The aliphatic materials are produced from a polyol or polyols and aliphatic isocyanates, such as HINDI or HDI, and the aromatic materials are produced from a polyol or polyols and aromatic isocyanates, such as MDI or TDI. The thermoplastic polyurethanes may also be produced from a blend of both aliphatic and aromatic materials, such as a blend of HDI and TDI with a polyol or polyols.

Generally, the aliphatic thermoplastic polyurethanes are lightfast, meaning that they do not yellow appreciably upon exposure to ultraviolet light. Conversely, aromatic thermoplastic polyurethanes tend to yellow upon exposure to ultraviolet light. One method of stopping the yellowing of the aromatic materials is to paint the outer surface of the finished ball with a coating containing a pigment, such as titanium dioxide, so that the ultraviolet light is prevented from reaching the surface of the ball. Another method is to add UV absorbers, optical brighteners and stabilizers to the clear coating(s) on the outer cover, as well as to the thermoplastic polyurethane material itself. By adding UV absorbers and stabilizers to the thermoplastic polyurethane and the coating(s), aromatic polyurethanes can be effectively used in the outer cover layer of golf balls. This is advantageous because aromatic polyurethanes typically have better scuff resistance characteristics than aliphatic polyurethanes, and the aromatic polyurethanes typically cost less than the aliphatic polyurethanes.

Other suitable polyurethane materials for use in the present invention golf balls include reaction injection molded ("RIM") polyurethanes. RIM is a process by which highly reactive liquids are injected into a mold, mixed usually by impingement and/or mechanical mixing in an in-line device such as a "peanut mixer," where they polymerize primarily in the mold to form a coherent, one-piece molded article. The RIM process usually involves a rapid reaction between one or more reactive components such as a polyether polyol or polyester polyol, polyamine, or other material with an active hydrogen, and one or more isocyanate-containing constituents, often in the presence of a catalyst. The constituents are stored in separate tanks prior to molding and may be first mixed in a mix head upstream of a mold and then injected into the mold. The liquid streams are metered in the desired weight to weight ratio and fed into an impingement mix head, with mixing occurring under high pressure, for example, 1,500 to 3,000 psi. The liquid streams impinge upon each other in the mixing chamber of the mix head and the mixture is injected into the mold. One of the liquid streams typically contains a catalyst for the reaction. The constituents react rapidly after mixing to gel and form polyurethane polymers. Polyureas, epoxies, and various unsaturated polyesters also can be molded by RIM. Further descriptions of suitable RIM systems is disclosed in U.S. Pat. No. 6,663,508, which pertinent parts are hereby incorporated by reference.

Non-limiting examples of suitable RIM systems for use in the present invention are BAYFLEX elastomeric polyurethane RIM systems, BAYDUR GS solid polyurethane RIM systems, PRISM solid polyurethane RIM systems, all from Bayer Corp. (Pittsburgh, Pa.), SPECTRIM reaction moldable polyurethane and polyurea systems from Dow Chemical USA (Midland, Mich.), including SPECTRIM MM 373-A (isocyanate) and 373-B (polyol), and ELASTOLIT SR systems from BASF (Parsippany, N.J.). Preferred RIM systems include BAYFLEX MP-10000, BAYFLEX MP-7500 and BAYFLEX 110-50, filled and unfilled. Further preferred examples are polyols, polyamines and isocyanates formed by processes for recycling polyurethanes and polyureas. Additionally, these various systems may be modified by incorporating a butadiene component in the diol agent.

Another preferred embodiment is a golf ball in which at least one of the boundary layer 16 and/or the cover layer 14 comprises a fast-chemical-reaction-produced component. This component comprises at least one material selected from the group consisting of polyurethane, polyurea, polyurethane ionomer, epoxy, and unsaturated polyesters, and preferably comprises polyurethane, polyurea or a blend comprising polyurethanes and/or polymers. A particularly preferred form of the invention is a golf ball with a cover comprising polyurethane or a polyurethane blend.

The polyol component typically contains additives, such as stabilizers, flow modifiers, catalysts, combustion modifiers, blowing agents, fillers, pigments, optical brighteners, and release agents to modify physical characteristics of the cover.

Polyurethane/polyurea constituent molecules that were derived from recycled polyurethane can be added in the polyol component.

In a particularly preferred embodiment of the invention, the golf ball preferably has an aerodynamic pattern such as disclosed in Simonds et al., U.S. Pat. No. 7,419,443 for a Low Volume Cover For A Golf Ball, which is hereby incorporated by reference in its entirety. Alternatively, the golf ball has an aerodynamic pattern such as disclosed in Simonds et al., U.S. Pat. No. 7,338,392 for An Aerodynamic Surface Geometry For A Golf Ball, which is hereby incorporated by reference in its entirety.

Alternatively, the cover 16 is composed of a thermoplastic polyurethane/polyurea material. One example is disclosed in U.S. Pat. No. 7,367,903 for a Golf Ball, which is hereby incorporated by reference in its entirety. Another example is Melanson, U.S. Pat. No. 7,641,841, which is hereby incorporated by reference in its entirety. Another example is Melanson et al, U.S. Pat. No. 7,842,211, which is hereby incorporated by reference in its entirety. Another example is Matroni et al., U.S. Pat. No. 7,867,111, which is hereby incorporated by reference in its entirety. Another example is Dewanjee et al., U.S. Pat. No. 7,785,522, which is hereby incorporated by reference in its entirety.

Bartels, U.S. Pat. No. 9,278,260, for a Low Compression Three-Piece Golf Ball With An Aerodynamic Drag Rise At High Speeds, is hereby incorporated by reference in its entirety.

Chavan et al, U.S. Pat. No. 9,789,366, for a Graphene Core For A Golf Ball, is hereby incorporated by reference in its entirety.

Chavan et al, U.S. patent application Ser. No. 15/705,011, filed on Sep. 14, 2017, for a Graphene Core For A Golf Ball, is hereby incorporated by reference in its entirety.

Chavan et al, U.S. patent application Ser. No. 15/729,231, filed on Oct. 10, 2017, for a Graphene And Nanotube Reinforced Golf Ball, is hereby incorporated by reference in its entirety From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A golf ball comprising:
a core;
a cover layer disposed over the core, the cover layer having a thickness ranging from 0.010 inch to 0.100 inch, the cover layer having a plurality of lattice members that define multi-faceted polygon-shaped areas, and a plurality of hemispherical indentations positioned in the plurality of lattice members, wherein each of the plurality of hemispherical indentations has a depth ranging from 0.00125 inch to 0.00375 inch.

2. The golf ball according to claim 1 wherein each of the plurality of lattice members has an apex with a width less than 0.00001 inch.

3. The golf ball according to claim 1 wherein the each of the plurality of multi-faceted polygons is either a hexagon or a pentagon.

4. A golf ball comprising:
a core;
a boundary layer disposed over the core;
a cover layer disposed over the boundary layer, the cover layer having a thickness ranging from 0.010 inch to 0.100 inch, the cover layer having a plurality of lattice members that define multi-faceted polygon-shaped areas, a plurality of hemispherical indentations positioned in the lattices of the plurality of lattice members, wherein each of the plurality of hemispherical indentations has a depth ranging from 0.00125 inch to 0.00375 inch.

5. The golf ball according to claim 4 wherein the cover layer is composed of a polyurethane material.

6. The golf ball according to claim 5 wherein the cover layer is formed by reaction injection molding.

7. The golf ball according to claim 5 wherein the cover layer is formed by casting.

8. The golf ball according to claim 4 wherein the cover layer is composed of a blend of ionomer materials.

9. The golf ball according to claim 8 wherein the cover layer is formed by injection molding.

10. The golf ball according to claim 4 wherein the core comprises a center and a mantle layer disposed around the center.

11. The golf ball according to claim 4 wherein the boundary layer is composed of a blend of ionomer materials.

12. The golf ball according to claim 4 wherein the golf ball further comprises a thread layer disposed around the core.

13. The golf ball according to claim 4 wherein the cover layer has a thickness ranging from 0.015 inch to 0.030 inch.

* * * * *